United States Patent
Alshehri et al.

(10) Patent No.: US 10,322,401 B2
(45) Date of Patent: Jun. 18, 2019

(54) MAGNETIC ADSORBENT FOR ORGANIC POLLUTANT REMOVAL

(71) Applicant: KING SAUD UNIVERSITY, Riyadh (SA)

(72) Inventors: Saad M. Alshehri, Riyadh (SA); Tansir Ahamad, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/715,022

(22) Filed: Sep. 25, 2017

(65) Prior Publication Data

US 2019/0091653 A1 Mar. 28, 2019

(51) Int. Cl.
*B01J 20/06* (2006.01)
*B01J 20/20* (2006.01)
(Continued)

(52) U.S. Cl.
CPC .............. *B01J 20/20* (2013.01); *B01J 20/06* (2013.01); *B01J 20/28009* (2013.01);
(Continued)

(58) Field of Classification Search
CPC .............. B01J 20/28009; B01J 20/0225; B01J 20/0229; B01J 20/06; B01J 20/28061;
(Continued)

(56) References Cited

U.S. PATENT DOCUMENTS

| | | |
|---|---|---|
| 4,201,831 A | 5/1980 | Brooks et al. |
| 4,260,523 A | 4/1981 | Tsukamoto |

(Continued)

FOREIGN PATENT DOCUMENTS

EP 0451299 B1 4/1995

OTHER PUBLICATIONS

Liang et al.; Magnetically separable nitrogen-doped mesoporous carbon with high adsorption capacity, J Mater Sci (2016) 51:3868-3879. (Year: 2016).*

(Continued)

*Primary Examiner* — Pranav N Patel
(74) *Attorney, Agent, or Firm* — Richard C. Litman

(57) ABSTRACT

The magnetic adsorbent for organic pollution removal is an adsorbent material, preferably in the form of microcapsules, for adsorbing organic pollutants, such as methylene blue, onto the microcapsules from contaminated water. Each of the magnetic adsorbent microcapsules is formed from magnetic iron oxide ($Fe_3O_4$) particles embedded in a nitrogen-enriched porous carbon matrix. To make the magnetic adsorbent microcapsules, urea and formaldehyde are mixed to form a pre-polymer solution. Magnetic $Fe_3O_4$ is mixed with an aqueous epoxy resin in hexane to form a mixture, which is then sonicated and added to the pre-polymer solution to form a polymeric solution. A surfactant, such as sodium lauryl sulfate, is added to the polymeric solution to form a suspension of magnetic microcapsules. The magnetic microcapsules are washed, filtered and dried before annealing in a tube furnace to form the adsorbent microcapsules, which are then washed and dried.

1 Claim, 5 Drawing Sheets

(51) Int. Cl.
  *B01J 20/28*  (2006.01)
  *C02F 1/28*  (2006.01)
  *B01J 20/30*  (2006.01)
  *C02F 101/30*  (2006.01)
  *B01J 35/10*  (2006.01)

(52) U.S. Cl.
  CPC ..... *B01J 20/28026* (2013.01); *B01J 20/3078* (2013.01); *C02F 1/281* (2013.01); *B01J 20/28061* (2013.01); *B01J 35/1019* (2013.01); *C02F 2101/308* (2013.01)

(58) Field of Classification Search
  CPC .... B01J 20/3293; B01J 35/1019; C02F 1/285; C02F 1/288; C02F 2101/308
  See application file for complete search history.

(56) References Cited

U.S. PATENT DOCUMENTS

| | | |
|---|---|---|
| 7,879,136 B2 | 2/2011 | Mazyck |
| 2015/0321168 A1 | 11/2015 | Na et al. |
| 2016/0243523 A1 | 8/2016 | Saini et al. |

OTHER PUBLICATIONS

Wang et al., Uniform Fe3O4/Nitrogen-Doped Mesoporous Carbon Spheres Derived from Ferric Citrate-Bonded Melamine Resin as an Efficient Synergistic Catalyst for Oxygen Reduction; ACS Appl. Mater. Interfaces, 9, 335-344. (Year: 2016).*
Liu et al.; Molecular-based design and emerging applications of nanoporous carbon spheres; Nature Materials | vol. 14 | Aug. 2015, pp. 763-774. (Year: 2015).*
Duman et al., Carbohydrate Polymers 147 (2016) 79-88. (Year: 2016).*
Sun et al., Adv. Mater. 2006, 18, 1968-1971. (Year: 2006).*
Safarik, Ivo, et al. "Magnetically Responsive Activated Carbons for Bio- and Environmental Applications." International Review of Chemical Engineering 4.3 (2012): 346-352.
Yao, Wei, et al. "Fe3O4@ C@ polyaniline trilaminar core-shell composite microspheres as separable adsorbent for organic dye." Composites Science and Technology 87 (2013): 8-13.
Kareem et al. International Journal of Chemical Sciences 14.2 (2016).
Wang et al. ACS Omega 2.4 (2017): 1505-1512.
Rochmadi et al., "Mechanism of Microencapsulation with Urea-Formaldehyde Polymer", American Journal of Applied Sciences 7(6): 739-745 (2010).
Yang et al., "Nitrogen-doped Fe3C@C particles as an efficient heterogeneous photo-assisted Fenton catalyst", RSC Adv. 2017, 7, 15168-15175.
Liang et al., "Magnetically separable nitrogen-doped mesoporous carbon with high adsorption capacity", Journal of Materials Science (2016), 51(8), 3868-3879 (Abstract only).

\* cited by examiner

MAGNETIC ADSORBENT FOR ORGANIC POLLUTANT REMOVAL

BACKGROUND

1. Field

The disclosure of the present patent application relates to wastewater treatment methods, and particularly to a magnetic adsorbent for removing organic pollutants from water that is formed from magnetic iron oxide nanoparticles embedded in a nitrogen-enriched porous carbon capsule.

2. Description of the Related Art

Methylene blue, also known as methylthioninium chloride, is a medication and dye with a wide variety of uses. Due to its versatility, methylene blue is also a common organic pollutant in industrial wastewater. Common side-effects from accidental human ingestion include headache, vomiting, confusion, shortness of breath, high blood pressure, serotonin syndrome, red blood cell breakdown and allergic reactions. Numerous techniques are presently used to remove methylene blue from aqueous solutions, including adsorption, membrane treatment, advanced oxidation processes and biological treatments. Among these various methods, adsorption is growing in interest due to its high levels of efficiency, cost effectiveness and relatively simple implementation.

Adsorption is particularly desirable since no other reagent is required to promote reaction between the adsorbent and adsorbate. However, conventional separation techniques of an adsorbent from aqueous solution, such as high-speed centrifugation or filtration, are inconvenient, tedious, inefficient, expensive and time consuming. Additionally, the production of adsorbents, such as porous activated carbon, is typically very complicated and expensive, requiring highly specialized equipment. Examples of such manufacturing processes include chemical vapor deposition, pyrolysis, hydrothermal carbonization, arc-discharge, and post-modification. Thus, a magnetic adsorbent for organic pollutant removal solving the aforementioned problems is desired.

SUMMARY

The magnetic adsorbent for organic pollution removal is an adsorbent material, preferably in the form of microcapsules, for adsorbing organic pollutants (including methylene blue) onto the microcapsules from contaminated water. Each of the magnetic adsorbent microcapsules is formed from iron oxide ($Fe_3O_4$) particles embedded in a nitrogen-enriched porous carbon matrix.

To make the magnetic adsorbent microcapsules, urea and formaldehyde are mixed to form a pre-polymer solution. Ferric oxide ($Fe_3O_4$) is mixed with an aqueous epoxy resin in hexane to form a mixture, which is then sonicated and added to the pre-polymer solution to form a polymeric solution. A surfactant, such as sodium lauryl sulfate, is added to the polymeric solution to form a suspension of magnetic microcapsules. The magnetic microcapsules are washed, filtered and dried before annealing in a tube furnace to form the adsorbent microcapsules made of magnetic (or ferrimagnetic) iron oxide ($Fe_3O_4$) particles embedded in a nitrogen-enriched porous carbon matrix. The adsorbent microcapsules are then washed and dried. In use, the adsorbent microcapsules are contacted with the contaminated water to adsorb organic pollutants from the contaminated water onto the adsorbent microcapsules, which are then removed from the contaminated water.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The magnetic adsorbent for organic pollution removal is an adsorbent material, preferably in the form of microcapsules, for adsorbing organic pollutants (including methylene blue) onto the microcapsules from contaminated water. Each of the magnetic adsorbent microcapsules is formed from magnetic (or ferrimagnetic) iron oxide ($Fe_3O_4$) particles embedded in a nitrogen-enriched, porous carbon matrix.

Example 1

Synthesis of Magnetic Adsorbent

Figure 1:
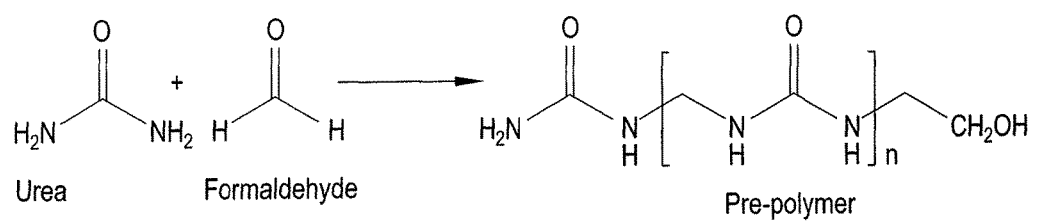
FIG. 1 is a reaction scheme for the formation of a urea-formaldehyde pre-polymer.

To make the magnetic adsorbent microcapsules, urea and formaldehyde are mixed to form a pre-polymer solution, as shown in FIG. 1. Thus, 5 g of the urea and 10 g of 37 wt % formaldehyde in water were mixed in a 250 mL three-necked, round-bottomed flask. The pH of the pre-polymer solution was adjusted to between 8 and 9 by adding ammonium hydroxide ($NH_4OH$). The temperature of the pre-polymer solution was kept at 70° C. for one hour.

Under agitation, 2 g of $Fe_3O_4$ was mixed with 10 wt % aqueous epoxy resin in 30 mL of hexane to form a mixture, which was then sonicated and added to the pre-polymer solution to form a polymeric solution containing $Fe_3O_4$ compounded with an organic layer.

A surfactant (0.25 g of sodium lauryl sulfate in the experiment) was added to the polymeric solution to form a suspension of magnetic microcapsules. The suspension was stirred for 20 to 30 minutes at a stir rate of 500-600 rpm. The pH of the emulsion was slowly adjusted between 3 and 4 by adding 10 wt % hydrochloric acid. The suspension was slowly heated to a target temperature of 60° C.-65° C., which was maintained for three hours. The suspension of microcapsules was cooled to ambient temperature, and the magnetic microcapsules (ferrimagnetic iron oxide nanoparticles embedded in a polymer capsule) were rinsed with deionized water, filtered and air-dried for 24 hours.

This was followed by annealing the magnetic microcapsules in a tube furnace at 800° C. (pyrolysis of the polymer capsule), with a heating rate of 5° C./min under the flow of helium (100 mL/min). The resultant magnetic adsorbent, comprising microcapsules, each made of iron oxide ($Fe_3O_4$) particles embedded in a nitrogen-enriched porous carbon matrix (i.e., porous graphitic carbon capsules doped with nitrogen, remaining after pyrolysis of the polymer), were then washed with deionized water and dried at 60° C. for 24 hours.

Example 2

Characterization of the Magnetic Adsorbent

Figure 2:
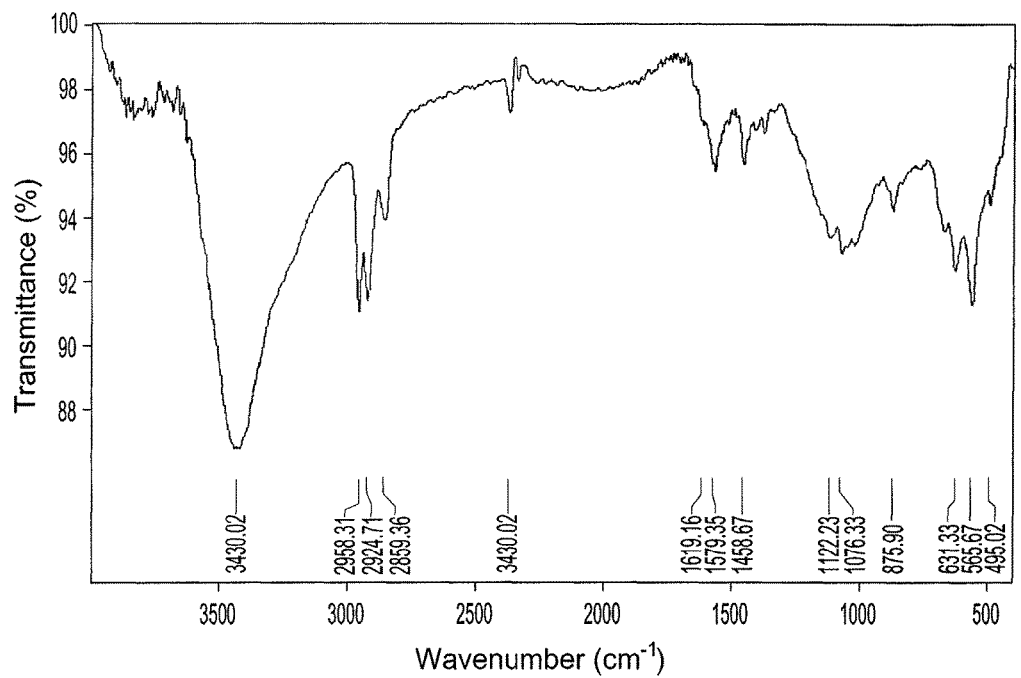
FIG. 2 shows is the Fourier transform infrared (FTIR) spectrum of a magnetic adsorbent for organic pollution removal.
Figure 3:
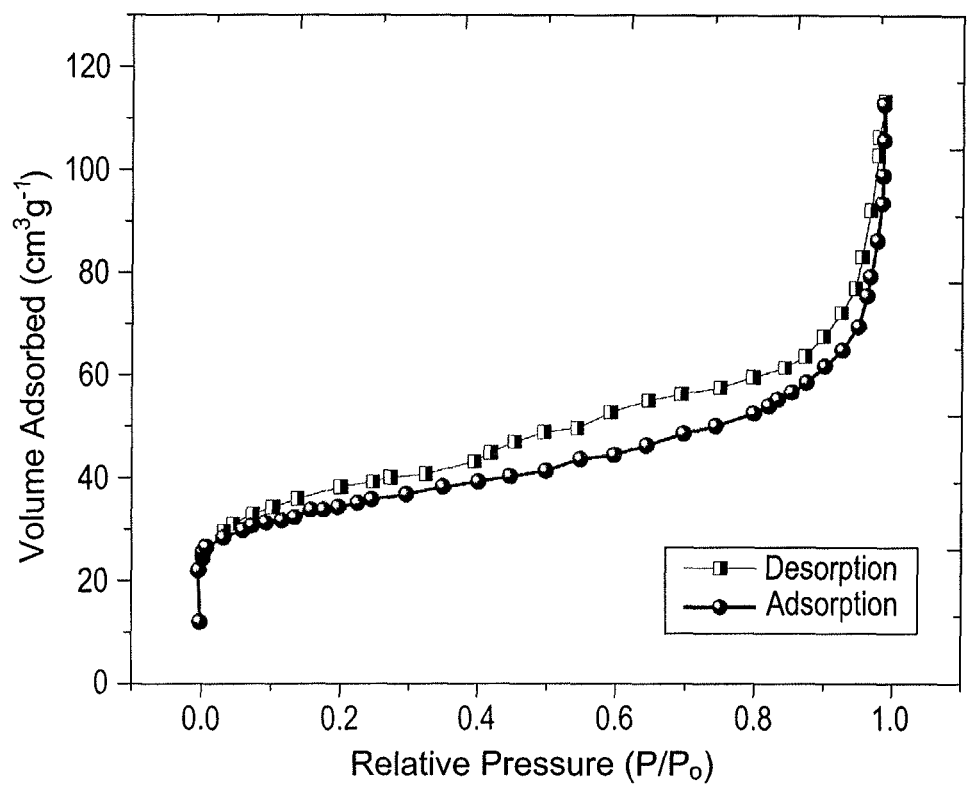
FIG. 3 is a plot of $N_2$ adsorption-desorption measurements of the magnetic adsorbent for organic pollution removal, which are used to measure porosity and BET surface area of the magnetic adsorbent.
Figure 4:
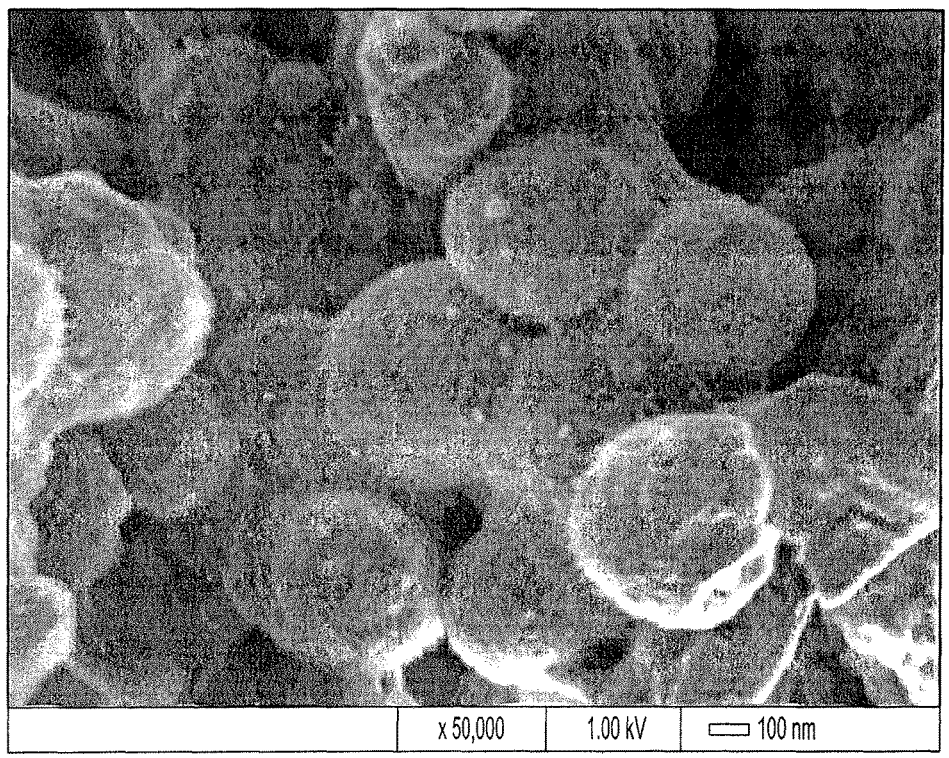
FIG. 4 is a scanning electron microscope (SEM) image of the magnetic adsorbent for organic pollution removal.
Figure 5:
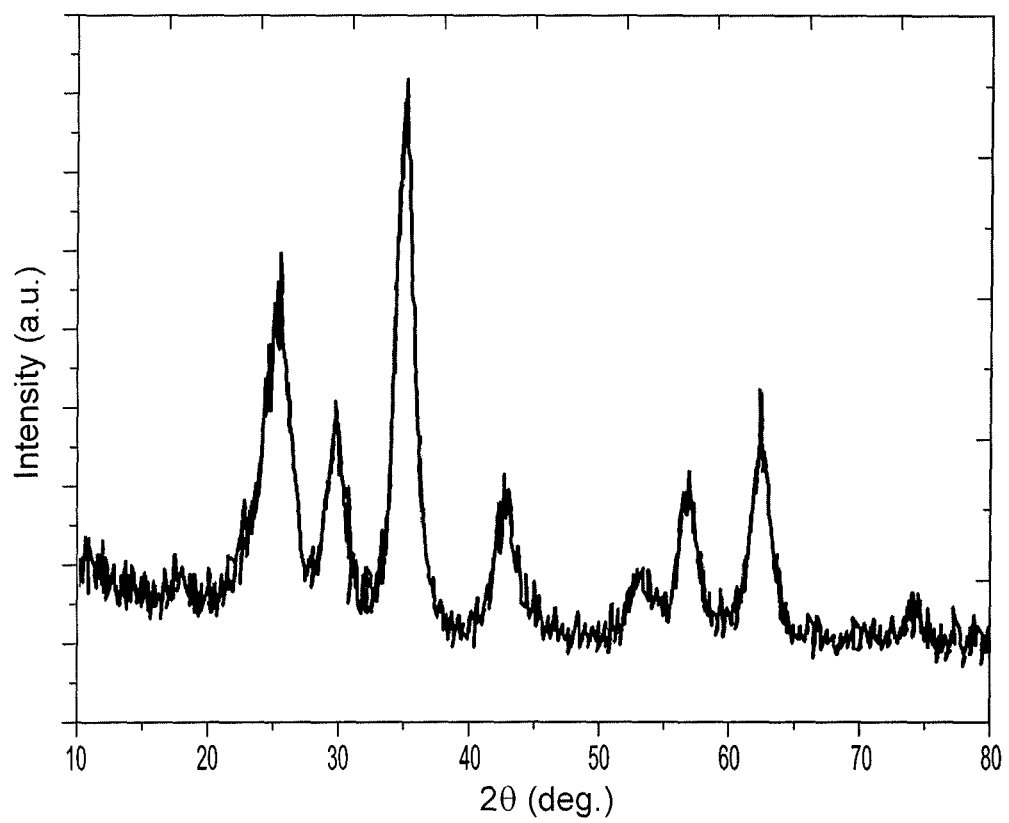
FIG. 5 is an X-ray diffraction (XRD) spectrum for the magnetic adsorbent for organic pollution removal.

FIG. 2 shows the FTIR spectrum of a sample of the magnetic adsorbent prepared in Example 1. The spectrum shows the formation of graphite carbons and the presence of nitrogen in the form of pyridine and pyrrole. FIG. 3 is a plot of $N_2$ adsorption-desorption measurements of the magnetic adsorbent prepared in Example 1. The adsorption isotherms are type IV for nitrogen-doped magnetic porous carbon capsules, and the Brunauer-Emmett-Teller (BET) surface area of the natural adsorbent was found to be 130.54 $m^2/g$. FIG. 4 shows a SEM micrograph of the magnetic adsorbent prepared in Example 1. The morphology of the adsorbent demonstrated in the micrograph shows the magnetic nanoparticles embedded in the carbon matrix of the capsules. FIG. 5 is the XRD (X-ray powder diffraction) spectrum (diffractogram) of the magnetic absorbent prepared in Example 1, which shows the characteristic diffraction peaks of $Fe_3O_4$ at 29.82, 35.10, 42.96, 53.28, 57.01, and 61.98, corresponding to the crystal planes (220), (311), (400), (422), (511), and (440), respectively. There is a broad diffraction peak at 25.29°, which can be indexed to the (002) plane of the disorderly stacked graphite carbon.

Example 3

Use of Magnetic Absorbent

In use, the magnetic adsorbent microcapsules are contacted with the contaminated water to adsorb organic pollutants from the contaminated water onto the adsorbent microcapsules, which are then removed from the contaminated water. Batch adsorption experiments were conducted in a 250 mL conical flask by placing 25 mg of the magnetic adsorbent microcapsules in 25 mL of a sample mixture of contaminated water, specifically methylene blue (300 ppm) at a temperature of 25° C. The test flask was sealed to prevent any change in volume of the solution during the experiments. An equilibrium study was performed by sampling at different time intervals (1-60 min) to achieve equilibrium. After the adsorption process, the magnetic adsorbent microcapsules were separated from the solution, and the concentration of methylene blue in the aqueous medium was determined by an ultraviolet-visible (UV-Vis) spectrophotometer at 670 nm.

The amount of methylene blue adsorbed onto the magnetic adsorbent, $q_e$, was calculated as:

$$q_e = \frac{(C_0 - C_e) \cdot V}{W},$$

where, V is the volume of adsorbate solution (in L), $C_0$ and $C_e$ are the initial and a final concentration of adsorbate in solution (mg/L), respectively, and W is the weight (g) of magnetic adsorbent. The batch experiments effectively showed that the eco-friendly and cost-effective magnetic adsorbent microcapsules were able to remove over 99.0% of the methylene blue from aqueous solution within 40 minutes. It should be noted that the adsorbed methylene blue can be desorbed using a regenerating solution, such as methanol. Reusing a sample adsorbent over ten consecutive cycles showed a loss of only 4.1% in adsorption percentage.

It is to be understood that the magnetic adsorbent for organic pollutant removal and method of making the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An annealed magnetic microcapsule adsorbent for organic pollution removal, consisting of annealed magnetic iron oxide ($Fe_3O_4$) particles embedded in a nitrogen-enriched porous graphite matrix, wherein annealing the magnetic microcapsules is in a tube furnace at a temperature of 800° C. at a heating rate of 5° C./minute under helium flow, thereby providing a Brunauer-Emmett-Teller (BET) surface area of the annealed $Fe_3O_4$ particles of 130.54 $m^2/g$.

* * * * *